United States Patent [19]

Fambrough

[11] Patent Number: 4,700,434
[45] Date of Patent: Oct. 20, 1987

[54] LINE TIGHTENING MECHANISM

[76] Inventor: David G. Fambrough, 13205 S. Hills Dr., Reno, Nev. 89511

[21] Appl. No.: 893,663

[22] Filed: Aug. 6, 1986

[51] Int. Cl.⁴ .............................................. A44B 21/00
[52] U.S. Cl. ........................................ 24/71.2; 256/40
[58] Field of Search .................. 24/71.2, 71.1, 68 CD; 256/40, 42, 44, 37

[56] References Cited

U.S. PATENT DOCUMENTS

| | | | |
|---|---|---|---|
| 614,581 | 11/1898 | Shown | 24/71.2 |
| 669,506 | 3/1901 | Clark | 24/71.2 |
| 973,034 | 10/1910 | Graham | 24/71.2 |
| 1,106,995 | 8/1914 | Verner et al. | 24/71.2 |
| 1,403,042 | 1/1922 | Leonard | 24/71.2 |
| 1,490,618 | 4/1924 | McKinney | 24/71.2 |
| 2,065,577 | 12/1936 | Gladstone | 24/71.2 |
| 2,642,639 | 6/1953 | Meighan et al. | 24/71.2 |
| 2,710,998 | 6/1955 | Meighan et al. | 24/71.2 |
| 3,416,763 | 12/1968 | Moreno | 24/71.2 |

Primary Examiner—Victor N. Sakran

[57] ABSTRACT

A circular disk having a tool actuable projection on one face and a threaded stud projecting from the other face. A slit formed in the threaded stud that cooperates with a threaded receiving tool held disk. The threaded stud is placed over a line with the line fitting into the slot. The threaded disk is then screwed over the threaded stud to confine the wire within the slot. A plurality of matched and aligned openings in both disks concentrically located near the outer diameters of the disks through which pins, bolts or cotter pins can be inserted after the disks are rotated relative to one another to wind the wire about the bolt during a tightening operation, thereby not permitting the tightened wound wire from unwinding from the formed coil.

6 Claims, 7 Drawing Figures

U.S. Patent   Oct. 20, 1987   4,700,434
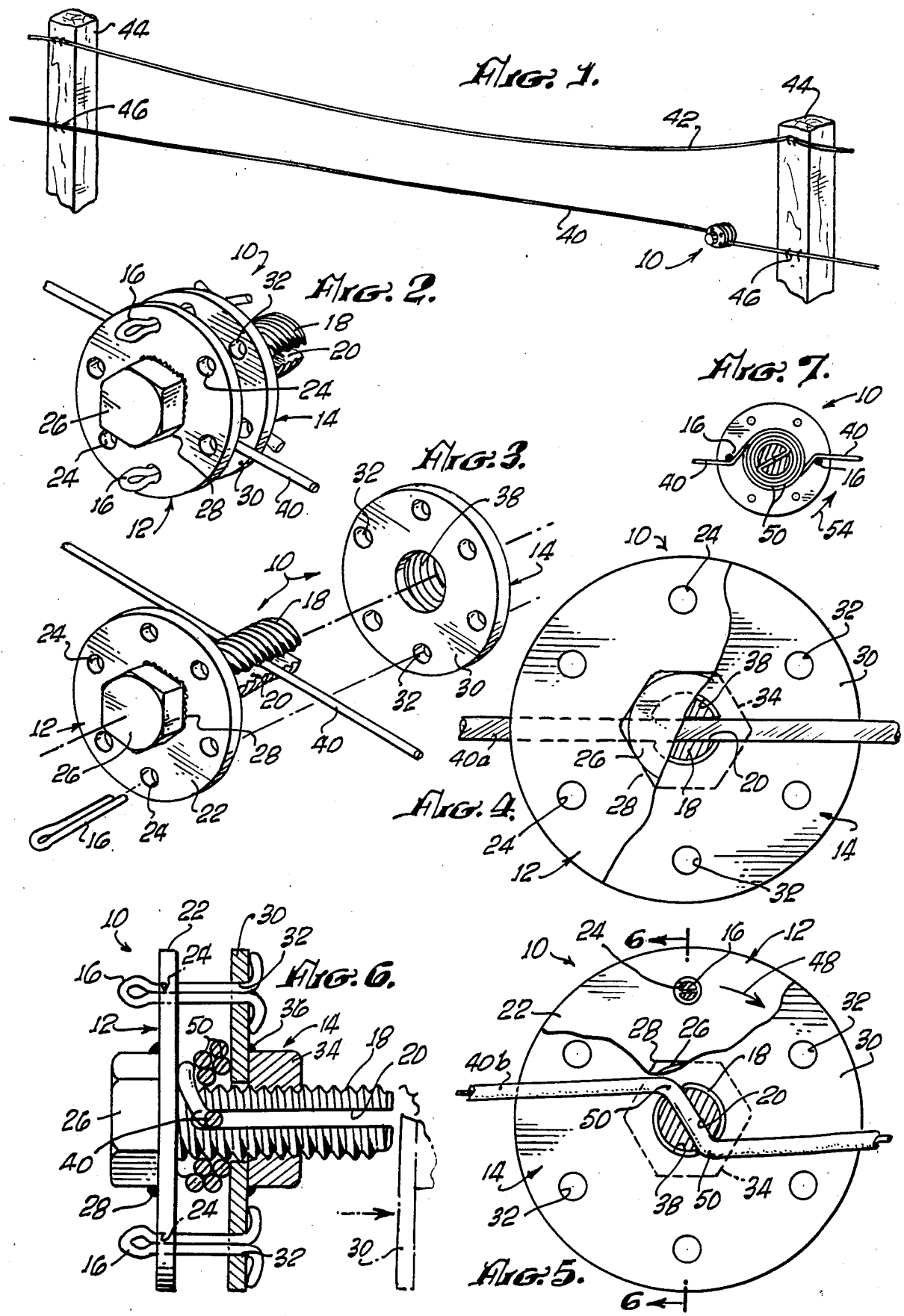

LINE TIGHTENING MECHANISM

CROSS REFERENCE TO RELATED PATENT APPLICATIONS

This patent application is not related to any other patent applications filed by me in the U.S. Patent and Trademark Office.

BACKGROUND OF THE INVENTION

1. Field of the Invention

This invention is in the field of line tightening devices which tighten wire, rope or cable lines during their initial installation or after they have loosened from stresses that stretched them to an undesired loose condition.

2. Background of the Invention

Wire, cord and cable lines have been subject to stresses caused by ageing and forces acting upon them from wind, loads and severe weather conditions.

Many attempts have been devised to correct this problem. Complete dismantling from the supports or anchoring points of such lines and resecuring the lines to their desired and original taughtness was one method. Cable pulling mechanisms using block and tackle arrangements would require loosening the anchoring points of at least one end of such lines. Even sticks were used to twist the slack line about the stick to take up the line excess.

These methods were often very expensive in labor and equipment, and many times left unsightly tightening sticks, and the like, hanging along such lines. Certain types of lines, such as barbed wire, telephone lines and cables forced the repairmen to place themselves in position to cause injury to themselves or other nearby.

It has been a great search for those in need of a line tightening mechanism that operated both safely and economically at a resonable cost. Therefore, I have developed such a device, as is set forth in this application, to accomplish the solution to the problems of the past.

SUMMARY OF THE INVENTION

The present invention that has been developed by the Applicant comprises a simple and inexpensive tool that easily accomplishes a tightening of a line right on the spot without removing the line from its moorings and without removing the anchor points that fasten the line from their position.

By simply placing a portion of the tool onto the wire and screwing a second portion to secure the wire in a slot, I have quickly and efficiently set the stage for the tightening process.

Simple rotation of the slotted threaded bolt about an axis perpendicular to the length of the line takes up the slack in the line and winds the line about the threaded bolt portion of the rotating member. When the tension has been achieved, and the slack taken out of the line, it is then a simple process to keep the threaded bolt from unwinding by connecting the two portions of the tool through pins, nails, or the like, and even simpler, with cotter keys.

Should the tension still not be sufficient, it is easily increased by withdrawing the locking pins and again duplicating the rotation process. The tool can be serviced regularly to insure that the desired tension is always at a proper level.

It is therefore an object of this invention to take up the slack in many types of lines either while installing such lines, or after the lines have become loosened.

It is a further object of this invention to take up the slack in lines with a simple, inexpensive device requiring very little effort or instruction by the operator.

Another object of this invention is to provide a slack eliminator for a line that can be regularly maintained as the slack reoccurs.

A further object of this invention is to provide a safe method in taking up slack in lines such as barbed wire, cable and electrical cord.

These and further objects and advantages of the present invention will become apparent to those skilled in the art after considering the following detailed Specification and the accompanying drawings.

BRIEF DESCRIPTION OF THE DRAWINGS

FIG. 1 is a fragmentary perspective on a reduced scale showing the application of the present invention to a line;

FIG. 2 is an enlarged perspective of the device shown in FIG. 1;

FIG. 3 is an exploded perspective of the elements shown in FIG. 2;

FIG. 4 is an enlarged front view of the line tightener with portions shown in section;

FIG. 5 is a view similar to FIG. 4 with the tightener of the invention being actuated by a tool;

FIG. 6 is a sectional view as viewed on line 6≠6 of FIG. 5 with certain parts in elevation; and FIG. 7 is a simplified view of the tool retaining a winding of line after being tensioned.

DESCRIPTION OF A PREFERRED EMBODIMENT

FIG. 1 illustrates the device of the invention as it is placed on a slack line and having tightened the line. The device is designated by the reference numeral 10.

A first front bolt portion 12 is shown in cooperation with a second nut portion 14 and being held together from rotation to one another by cotter pins 16. A threaded stud 18 formed with a slot 20 is formed integrally with disk member 22. This slot is provided for a line to be inserted therethrough.

A series of holes 24 are provided for the cotter pins 16, or the like. A tool receiving projection, such as a hex head 26 is located on the front face of the disk 22. To effect the integral construction between the stud 18 and the disk 22 there is shown some weldment at 28.

The nut portion of the tool comprises a disk 30 of a diameter the same as disk 22 and has openings 32 to match the openings 24 on the disk 22. As shown in FIGS. 4, 5 and 6, a threaded nut member 34 is welded at 36 to the rear face of disk 30. The nut has threads internally formed at 38 to receive the threaded bolt 18.

The line shown in FIGS. 2, 3 and 6 is shown as a wire such as is used in fencing, clothes lines, and the like. In other Figures the line is shown as 40a being a stranded cable (FIG. 4) and as an electrical insulated line 40b (FIG. 5). It is understood that the line can be made of rope, and the like, if the situation provides for it.

In FIG. 1, the upper line is shown in a sagging condition, while the lower line 40 is shown as having been tightened by the device of the invention. Fence posts are shown at 44 as being a typical support for the lines 40 and 42 being affixed by staples, or the like, 46.

In FIG. 5, an arrow 48 shows the direction that the front disk would be rotated in order to begin the slack elimination of the line 40b, and the cotter pin 16 would be inserted only when the tightening procedure had been completed. Kinks 50 are shown as being shown as just beginning to form, and finally the line would evolve into a winding as indicated in FIG. 7. Then the pins 16 would be inserted in order to keep the coil from unwinding. The arrow 54 shows in FIG. 7 how the pins 16 would ultimately bear against the line 40 in two places thereby preventing the lightening assembly 10 from becoming unwound.

In operation, the operator would first slip the slotted bolt over a line as is shown in FIG. 3. Then the nut portion 14 would be screwed upon the threaded bolt 18 until the disk 30 came closer to the disk 22. At that time, the operator would attach a wrench or ratchet tool to the projection 22 and begin rotation of the stud 18.

After the line had reached the desired taughtness, then the operator would insert the pins 16, or equivalents such as nails or pins through the holes 24 and 32. The wrench is then withdrawn and the wire assumes the condition in FIG. 7 to complete the procedure.

Should the line agan become loose and in a sagging condition, all the operator has to do at a later time is to witndraw the pins 16.

While the embodiments described above are shown for the purposes of illustration only, and not to limit the scope of the invention, the following are the claims presented in this matter.

I claim:

1. An apparatus for taking up the slack in loose lines which includes: A first and second set of circular disks in alignment with one another; said first disk comprising a tool receiving projection on a first flat face, a threaded and slotted stud affixed to and projection from the opposite flat face of said loose line being secured to the slotted portion of said stud during the tightening process; a threaded nut affixed to a flat face of said second disk opposite the face of said second circular disk; a plurality of openings spaced about the center of said first and second circular disks; an opening of sufficient size in said second circular disk in alignment with said threaded not to allow passage of said threaded and slotted stud; and pins for locking both first and second circular disks from rotation to one another said pins passing through aligned openings in said first and second circular disks.

2. An apparatus as set forth in claim 1 wherein said locking pins are cotter pins.

3. An apparatus as set forth in claim 1 wherein said locking pins are nails.

4. An apparatus as set forth in claim 1 wherein said locking pins are nut and bolt assemblies.

5. The method of taking the slack out of loose lines which comprises:
providing a first circular disk that has on one flat face a tool receiving projection, a threaded stud projection from the opposite flat face of said first circular disk, and providing a slot in said threaded stud projection;
inserting a line to be tightened into said slot in said threaded stud;
providing a second circular disk with an opening at its center, and affixing a threaded nut to the opposite side of said second disk; Threading said second circular disk onto said slotted threaded stud of said first circular disk to a position proximate said wire; providing aligned openings in said first and second circular disks;
rotating said first disk with a tool until said line is wound about said slotted stud and in a location between said first and second disks until the line becomes taut; and
inserting locking pins through aligned openings in said first and second circular disks to prevent the tightened line from becoming loose.

6. The method as set forth in claim 6 wherein said tool receiving projection is a hex head.

* * * * *